Figure 1:
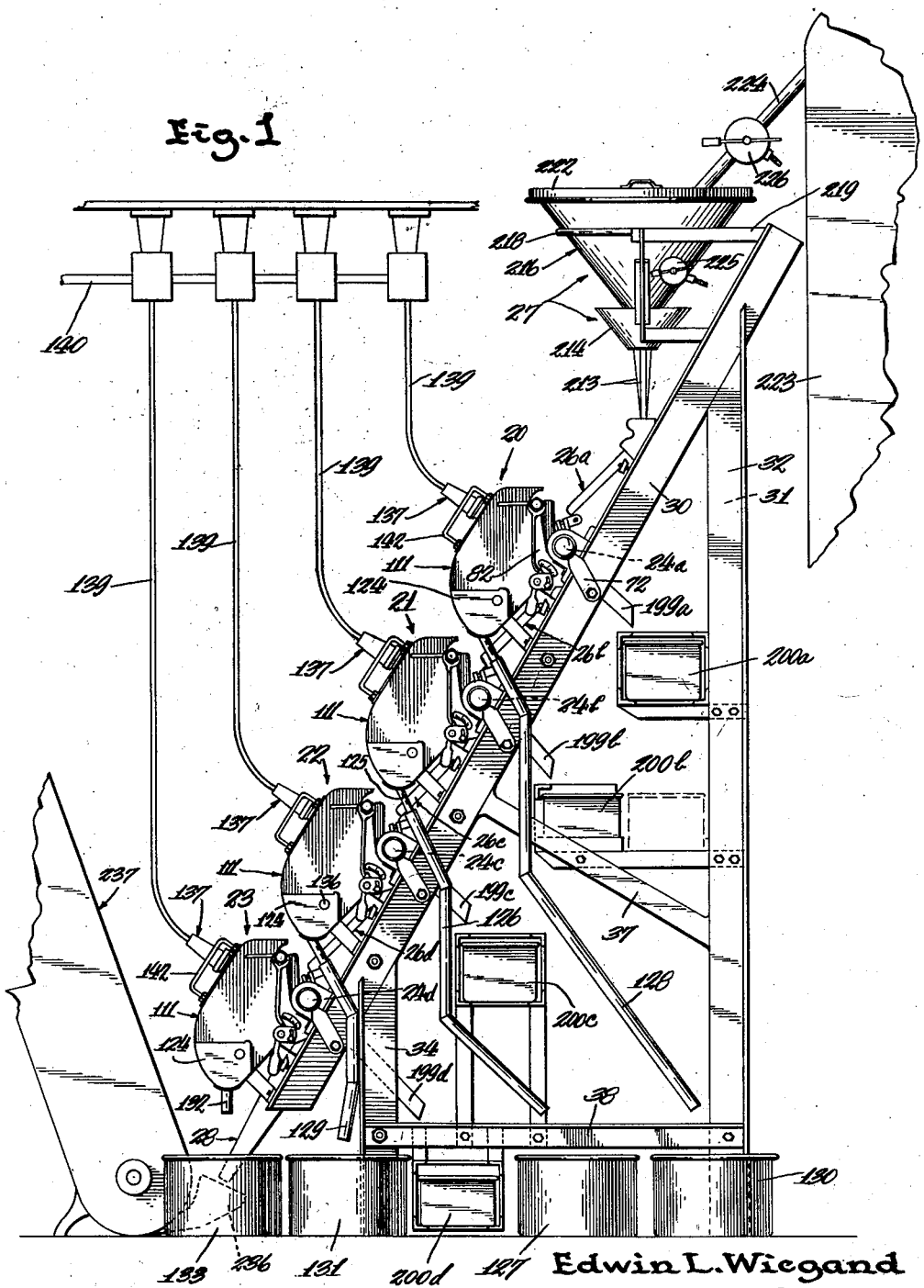

Sept. 3, 1940.  E. L. WIEGAND  2,213,510
APPARATUS FOR CLASSIFICATION AND SEPARATION OF MATERIAL PARTICLES
Filed June 23, 1937  10 Sheets-Sheet 4

Edwin L. Wiegand
INVENTOR
ATTORNEYS

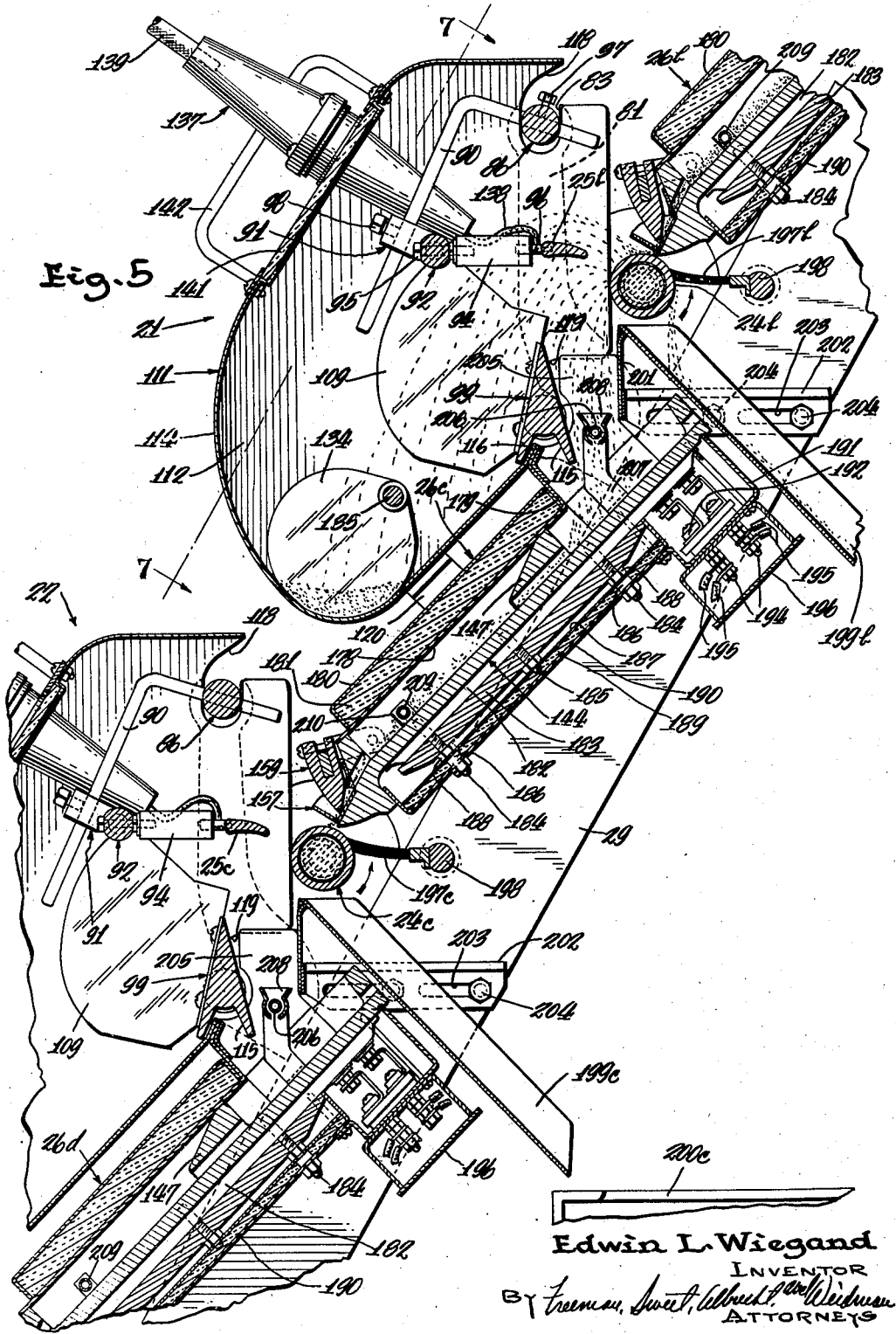

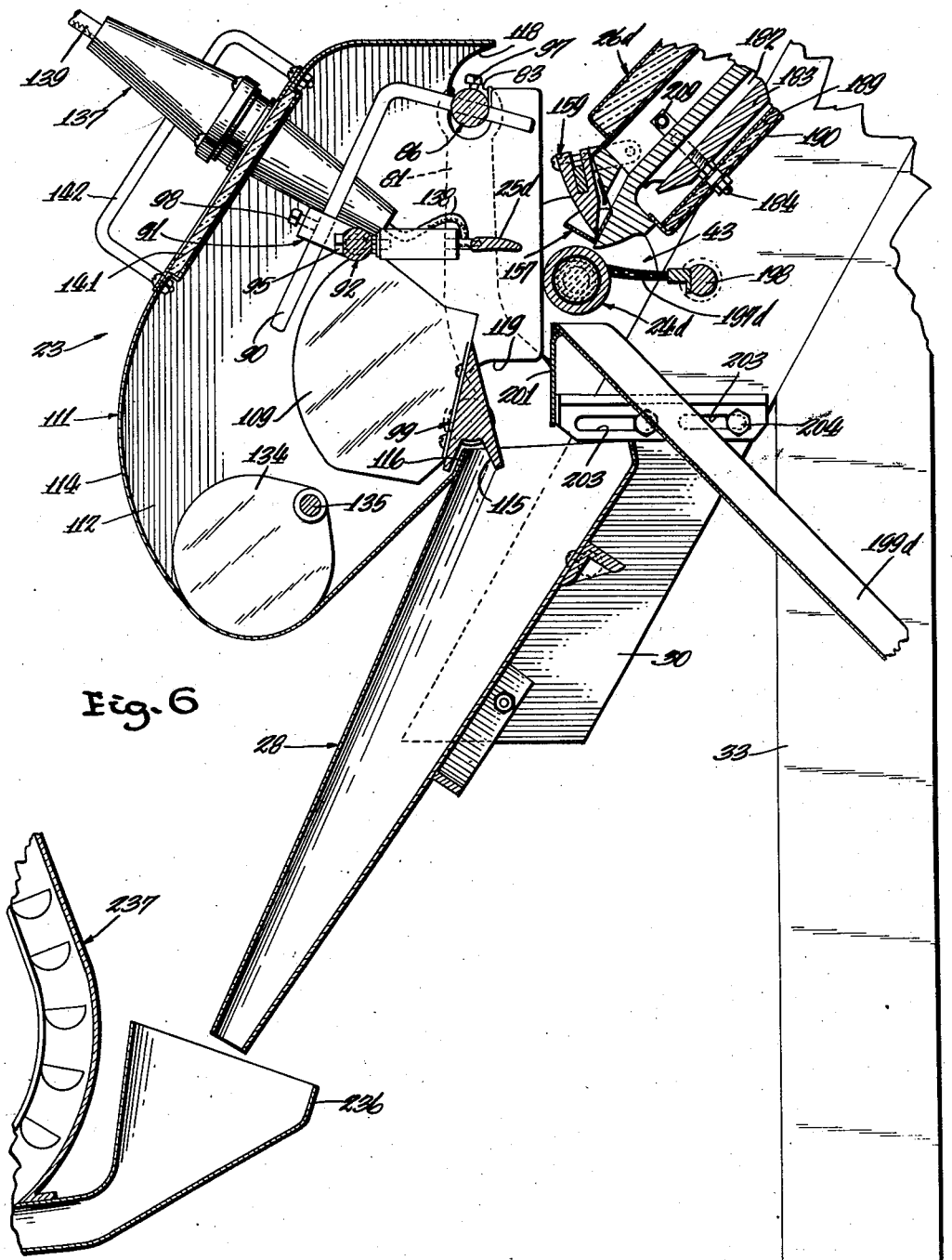

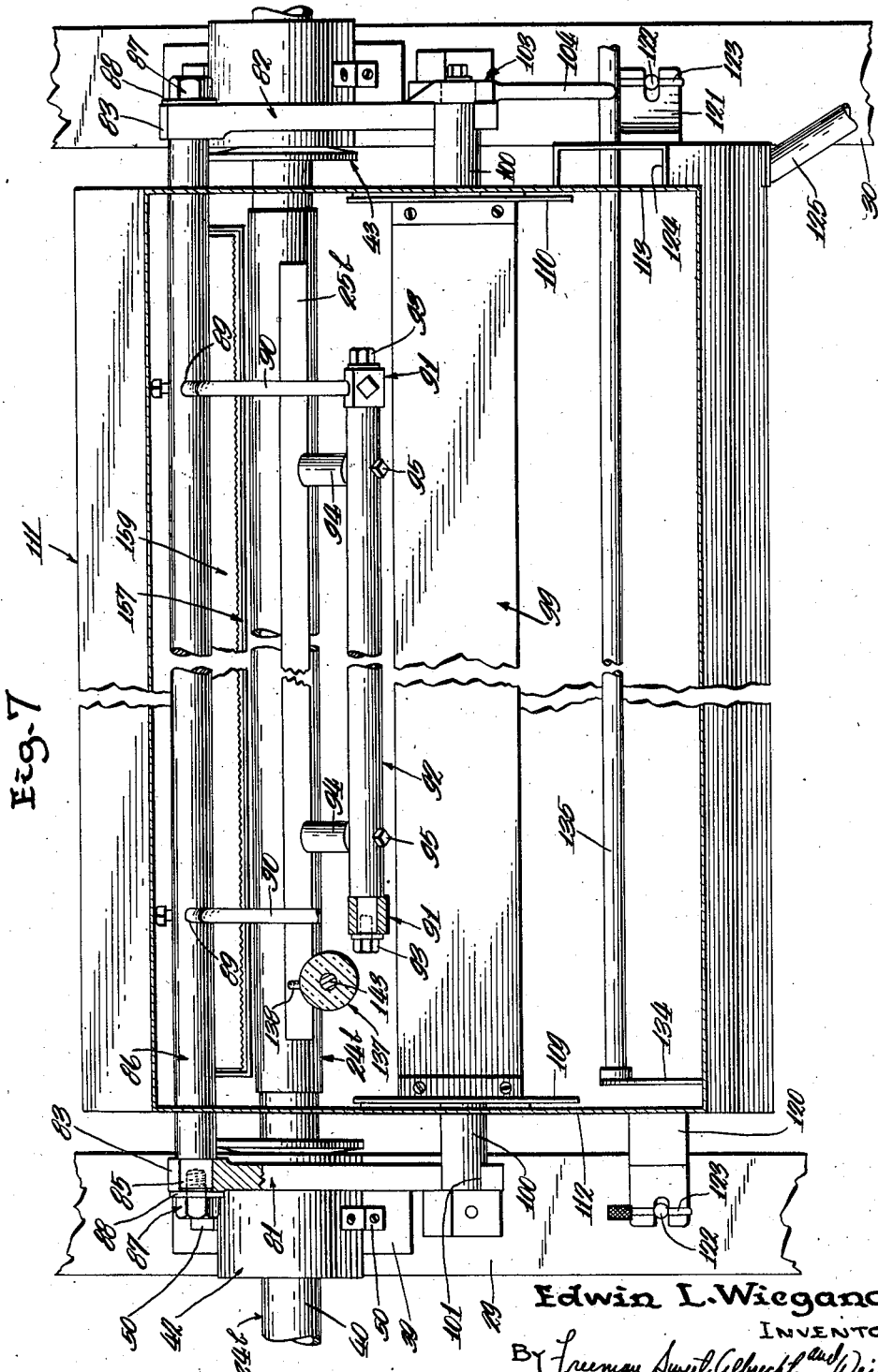

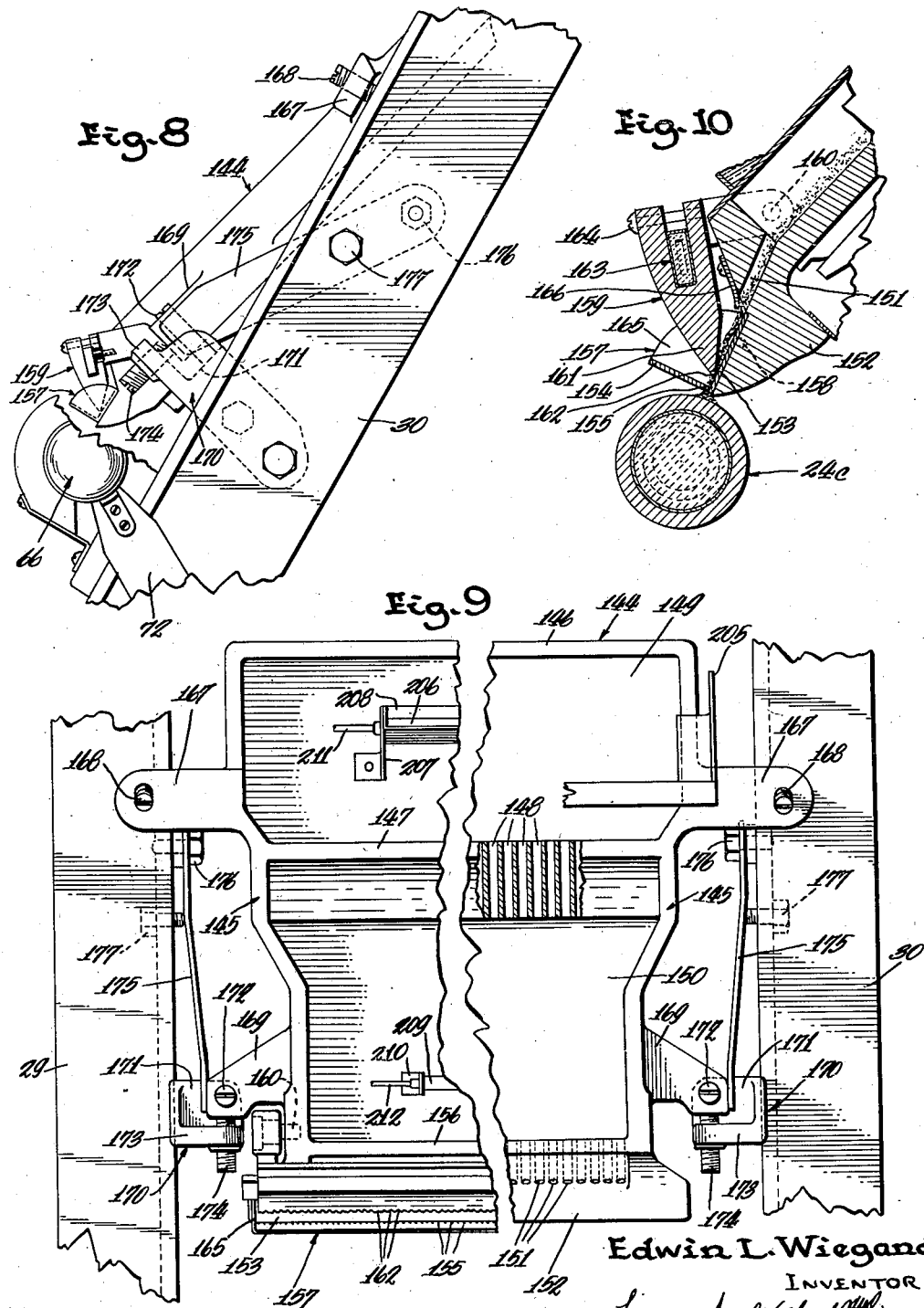

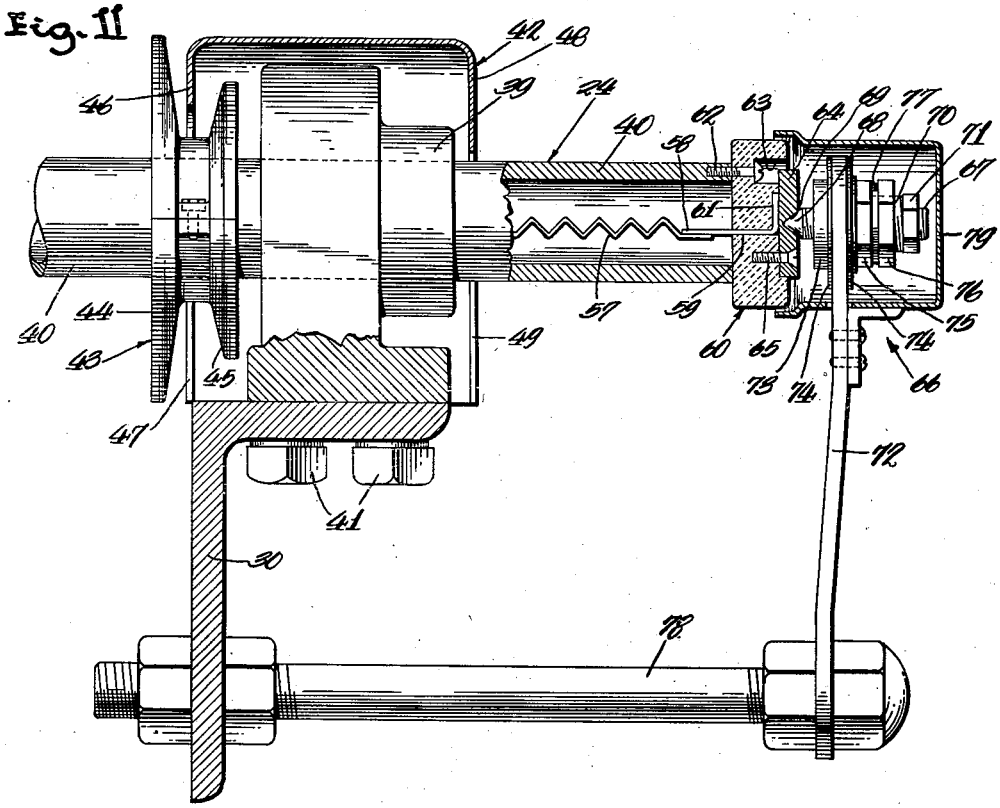

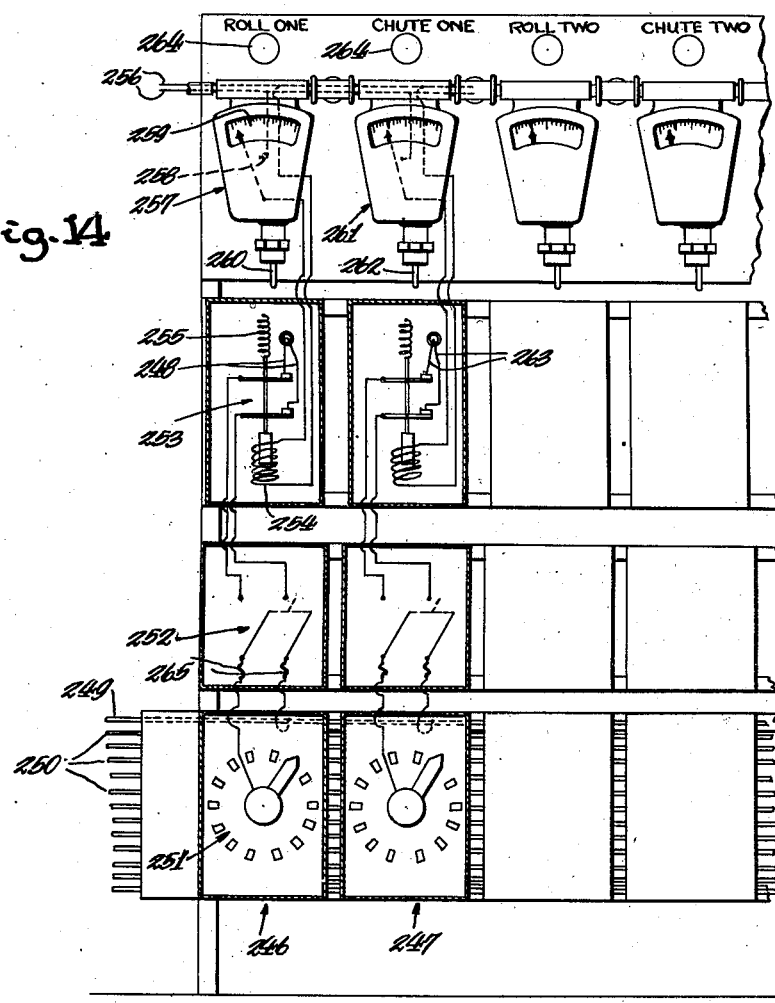
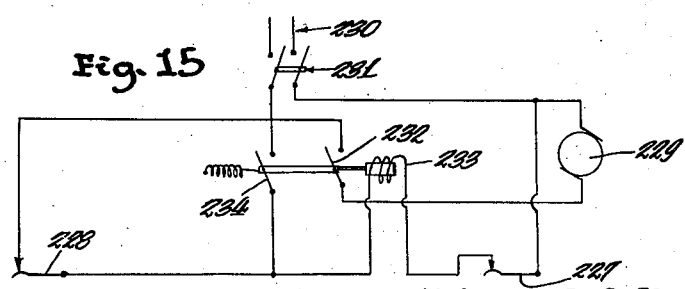

Patented Sept. 3, 1940

2,213,510

UNITED STATES PATENT OFFICE 2,213,510

APPARATUS FOR CLASSIFICATION AND SEPARATION OF MATERIAL PARTICLES

Edwin L. Wiegand, Pittsburgh, Pa.

Application June 23, 1937, Serial No. 149,806

16 Claims. (Cl. 209—127)

My invention relates to electrostatic classification and separation of material particles, and more particularly to new and improved apparatus for carrying out the processes of thermo-electrostatic separation of particles as described and claimed in my co-pending application Serial Number 755,694, and the principal object of my invention is to provide a new and improved process of electrostatic separation and more particularly to provide new and improved apparatus for electrostatic separation in general and in particular for thermo-electrostatic separation.

Figure 2:
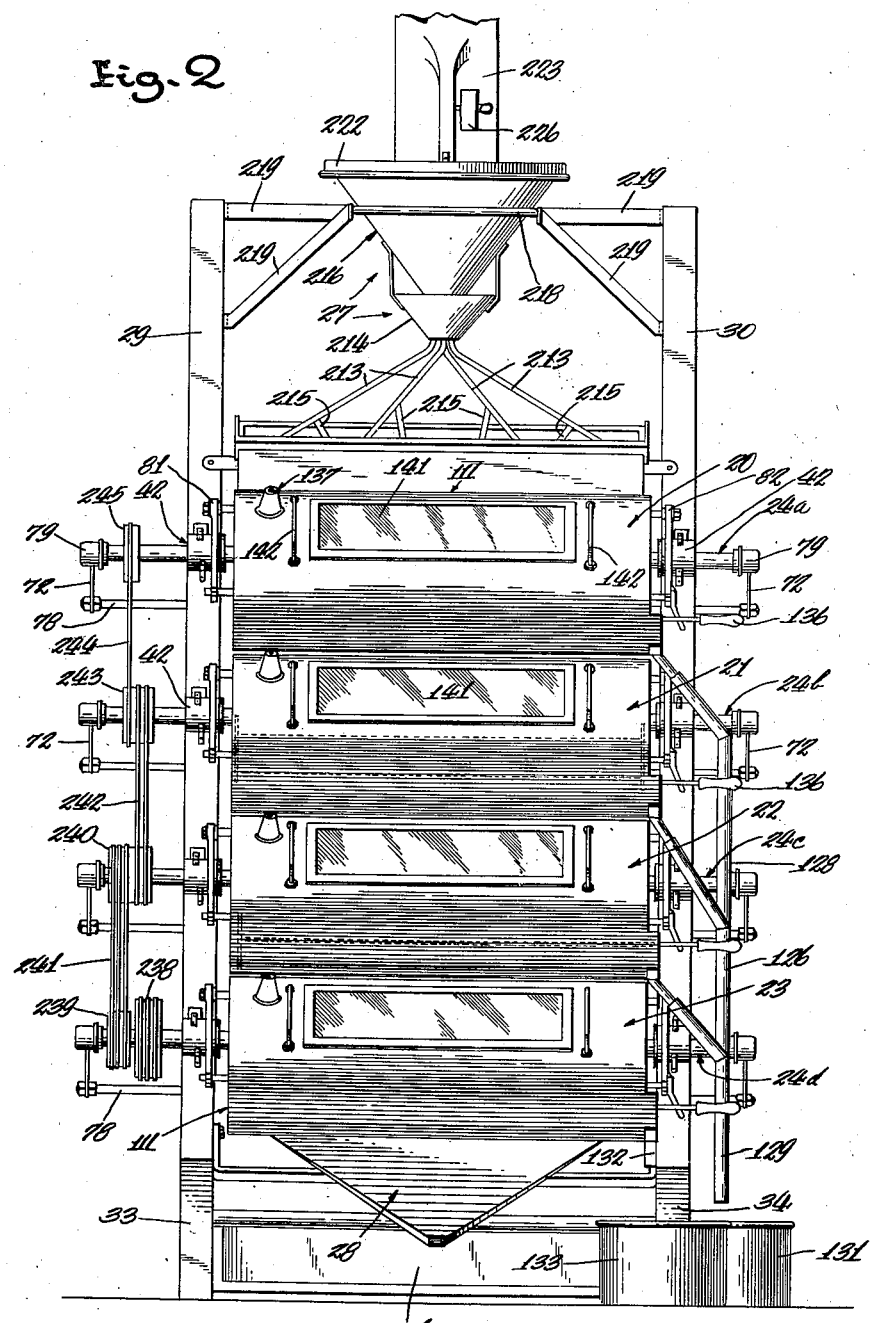
Figure 3:
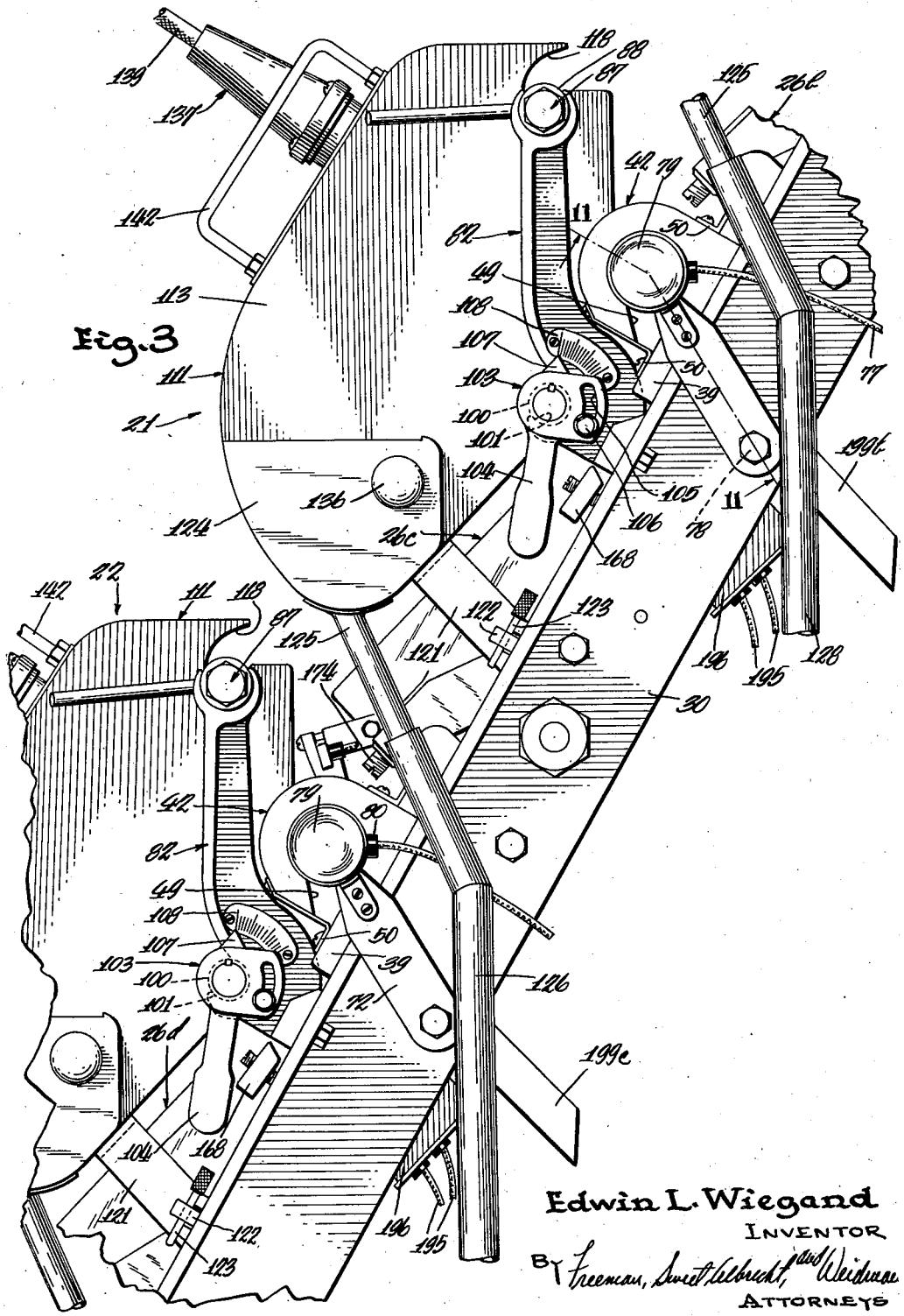
Figure 4:
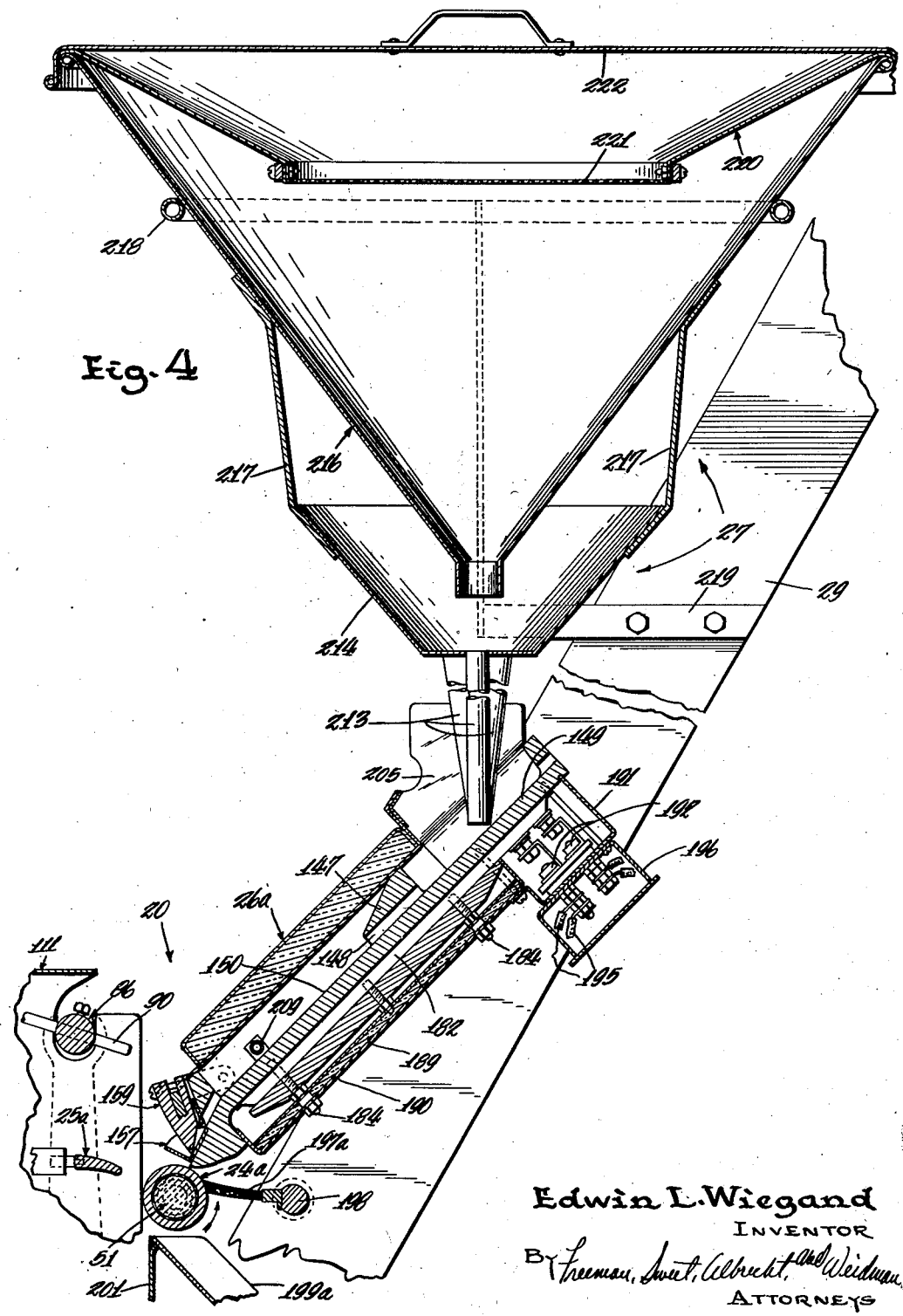

In the drawings accompanying this specification, and forming a part of this application, I have shown, for purposes of illustration, one form which my invention may assume, and in these drawings:

Figure 1 is a side elevational view of an embodiment of my invention, parts being broken away, Figure 2 is a front elevational view of the structure shown in Figure 1, certain parts being omitted and other parts being broken away, Figure 3 is an enlarged fragmentary side elevational view, Figure 4 is a fragmentary vertical sectional view, illustrating the hopper feed to the first unit of the apparatus, Figure 5 is a fragmentary vertical transverse sectional view, illustrating two intermediate rolls and cooperating parts, Figure 6 is a fragmentary vertical transverse sectional view illustrating the lowermost roll of the machine and the immediately associated parts, Figure 7 is a broken sectional view taken on the line 7—7 of Figure 5, looking in the direction of the arrows, certain parts being omitted for the sake of clearness, Figure 8 is a fragmentary side elevational view, with parts omitted for the sake of clearness, showing the method of supporting the delivery chutes, Figure 9 is a broken plan view of the chute shown in Figure 8, parts being broken away to better show the construction, Figure 10 is an enlarged fragmentary transverse sectional view showing a roll and certain adjacent parts, Figure 11 is an enlarged side elevational view, partly in section, illustrating a portion of a roll and means for making electrical connection to the element for heating the roll, Figure 12 is a broken longitudinal sectional view through a roll, and drawn to a reduced size, showing the heating element disposed within the roll, Figure 13 is a diagrammatic view illustrating the construction of the resistor within the heating element shown in Figure 11, Figure 14 is a broken elevational view, parts being shown in section, and parts being diagrammatically shown, of a control board, and Figure 15 is a diagrammatic view showing an electrical control circuit which may be used with the embodiment of my invention.

Referring to the drawings and to the apparatus as a whole, the apparatus here shown is particularly adapted for the purpose of successively passing the particles to be treated through a plurality of treating zones and accordingly there are shown, in this instance, four treating units 20, 21, 22, 23, each disposed at a lower level than the preceding unit. Each unit includes a roll, each roll being designated primarily by the reference numeral 24 and the respective rolls being designated 24a, 24b, 24c, 24d. Each unit also includes an electrode 25 (see Figures 4 and 5, for example), and a chute 26. The uppermost chute 26 (designated 26a) is adapted to receive particles thereon, from hopper means 27, and deliver them to the roll 26a. The chutes 26b, 26c, 26d are adapted to respectively receive a portion of the particles coming from the roll immediately above and deliver them to the roll immediately below. A portion of the particles coming from the lowermost roll 24d, fall into a chute 28. Thus a portion of the material delivered to the chute 26a passes through all of the treating zones and finally reaches the chute 28. Other portions of the material are successively separated out, all as will fully appear hereinafter.

The units 20, 21, 22, 23 are shown as supported on a frame comprising spaced supporting members 29, 30, such as angle bars, inclined about thirty degrees with respect to the vertical, these supporting members being carried by spaced upright angle bars 31, 32 extending from substantially the upper extremity of the inclined supports 29, 30 to the floor level, and by spaced angle bars 33, 34 extending from substantially the lower extremity of the inclined supports 29, 30 to the floor level. The inclined supports 29, 30 and the upright supports 31, 32, 33, 34 are braced in any suitable manner, as by bracing bars, some of which, as 37, 38 are visible in Figure 1.

Each of the rolls 24 extends transversely across the inclined supports 29, 30, and near the end of each roll is a roller bearing 39, best shown in Figure 11. The rolls 24 have reduced extremities 40 and each bearing 39 is adapted to receive and journal one of the reduced extremities 40. The bearings 39 at one side of the apparatus are supported by the inclined support 29 and those at the other side of the apparatus by the inclined support 30.

That part of the roll, of largest diameter, between the reduced extremities 40, for the sake of brevity will be referred to as the active part.

The bearings 39 are fastened to the respective inclined supports 29, 30 as by studs 41. Each bearing 39 is preferably covered by a sheet metal housing 42. To efficiently protect the bearing against the entrance of particles, a split ring 43 having flanges 44, 45 providing an annular groove is secured to the reduced extremity of the roll at the side of the bearing nearest thte active part of the roll, and an end wall 46 of the housing 42 is provided with a slot 47 so constructed and arranged that the side wall 46 cooperates with the groove provided by the flanges 44, 45 to prevent the entrance of particles into the bearing. The other end wall, 48, of the housing 42 is also provided with a slot, 49, slidably fitting the reduced end 40 of the roll. By reason of the slots 47, 49 the housing 42 may be readily assembled with the bearing and associated parts, and may be fastened in place in any suitable manner, as by metal strips 50 fastened by screws to the housing and to the block or pedestal of the bearing 39, as best seen in Figure 3.

Each roll 24 is tubular and disposed within each roll is an electric heating element 51, as may be seen best in Figure 12. The heating element 51 is preferably of the cartridge type, and comprises an outer sheet metal sheath 52 closely and slidably fitting the inside diameter of the roll 24, and containing a resistor 53 here shown as a helical resistance wire wound upon a refractory form 54. Suitable refractory material 55 is disposed within the sheath to space and electrically insulate the resistor from the sheath.

As indicated in Figure 13, the resistance wire is desirably wound closer together at the extremities of the heating element 51 than at the intermediate portion, so as to more evenly distribute the heat throughout the roll by compensating for heat loss along the extremities of the roll.

The respective ends of the heating element 51 are provided with terminals 56, to each of which is clamped a metallic corrugated strip 57, preferably of Monel metal. To the free end of each sheet metal strip 57 is secured a rather heavy piece of Monel wire 58, this wire passing through an aperture 59 in a block or disk 60, desirably formed of lava. The wire 58 has its end bent over to lie in a recess 61 formed in an end surface of the insulating block 60. The insulating block 60 is secured to the extremity of the reduced end 40 of the roll 24 by means of machine screws, one of which, 62, is visible in Figure 11. The heads of the screws 62 are disposed within recesses 63 formed in the block 60. The block is also provided with a shallow central recess for receiving a metal disk 64. The disk 64 is secured to the insulating block 60 by means of machine screws 65, and the construction and arrangement is such that the metal disk 64 is thus pressed into electrical contact with the bent-over end of the wire 58.

As best seen in Figure 11, relatively stationary contact means 66 is provided for carrying current to the contact disk 64, and it will of course be understood that a similar contact means is provided at the other end of the roll 24.

The contact means 66 comprises a screw 67 having a conical end 68 adapted to engage in a complementary conical recess 69 in the metal disk 64. The screw 67 is in threaded engagement with an internally threaded sleeve 70 and may be held in fixed relation with the sleeve 70, after any desired adjustment, by means of a lock nut 71. The sleeve 70 is carried by a resilient arm 72 which has an aperture (not shown) through which the sleeve is disposed, the sleeve being insulated from the arm by a suitable insulating sleeve (not shown) and washers 74. One end of the sleeve 70 has a flange 73 bearing against the adjacent insulating washer 74 interposed between it and the arm 72. The other end of the sleeve 70 is externally threaded and carries a nut 75, bearing against the other insulating washer 74, for fastening the sleeve to the arm. A nut 76 serves to clamp a conductor 77 against the nut 75.

The arm 72 is fastened at its lower end to a rod 78 in turn fastened to the adjacent support member 30. It will be evident that by adjusting the screw 67, the pressure applied by the resilient arms 72 to press the screw point 68 into the recess 69 may be varied and that the screw point 68 and the disk 64 provide a slip connection permitting rotation of the roll 24.

The arm 72 may also carry a cup-shaped sheet metal housing 79 for enclosing the contact means 66, and may at least partially surround the insulating disk 60. The conductor 77 may be led through an insulating bushing 80 (see Figure 3) carried in the housing 79, to a source of current, and the conductor 77 at the other end of the roll may be similarly so led, thereby to supply heating current to the resistor 53.

Each of the rolls 24 in the illustrated embodiment of the invention is constructed and arranged as hereinbefore described and is provided with contact means for supplying current to its heating element as described.

The electrodes 25 of each of the units 20, 21, 22, 23 are identical, as are also the respective means for supporting these electrodes and accordingly reference will be had to the electrode 25b of the unit 21 shown best in Figures 3, 5, and 7.

The electrode 25b is spaced from the roll 24b, and extends parallel to the roll 24b, approximately the active part of the roll. The electrode is adjustable to any desired position with respect to the roll, as will appear.

The adjustable supporting means for the electrode 25b includes arms 81, 82 respectively secured at their lower ends to the supporting members 29, 30 adjacent the bearings 39. Each arm 81, 82 has an open slot 83, at its upper end, forming a bearing surface. The slots 83 serve to journal the reduced ends 85 of a bar 86, which may be rotatably adjusted in the slots 83 and then held against rotation by means of machine bolts 87 screw-threaded into the extremities of the bar 86 and bearing against washers 88 in turn bearing against the adjacent surface of the respective arms 81, 82. The bar 86 is provided with spaced apertures 89 to slidably receive one end of a pair of similar angle rods 90. The other end of each angle rod 90 slidably supports a block 91. The blocks 91 have apertures serving to journal the reduced ends of a second bar, 92, and the bar 92 may be held against rotation in adjusted position by means of machine bolts 93 in a manner similar to that described in connection with the bar 86. Insulating members 94 are suitably carried by the second bar, 92, as by means of machine bolts 95, and the electrode 25b is carried by the spaced insulating members 94, in any suitable manner, as by studs 96.

It will be evident that the electrode 25b may be swung about the axis of the rod 86 and held in position by the machine bolts 87. Further, that the electrode 25b may be adjusted in a generally horizontal direction by sliding the upper ends of the angle rods 90 through the apertures in the rod 86. Set screws 97 serve to hold the angle rods in the adjusted position. Further, that the electrode 25b may be adjusted in a generally vertical direction by sliding the blocks 91 on the angle rods 90. Set screws 98 serve to hold the blocks 91 in adjusted position.

Under the influence of the electrode 25b, different particles describe different trajectories in coming from the roll 24b, as indicated by the dotted lines in Figure 5. The electrode is of a cross-sectional outline that may be described as of elongated ovoid shape and is moreover desirably convex on its upper side and concave on its lower side so as to conform approximately to the trajectories of the particles in its neighborhood.

To divide the particles so that some proceed to one place and others to another place, adjustable dividing means, here shown as a divider bar 99 of generally triangular cross-section, is provided. The divider bar 99 is disposed parallel to the roll 24b and the triangular portion of it is somewhat longer than the active part of the roll.

The divider bar 99 is provided with cylindrical ends 100 adapted to be received in journal slots 101 in the lower sides of the arms 81, 82, so that the divider bar is pivotally mounted for movement about its longitudinal axis, within limits. Within these limits the apex of the bar 99 is directed generally toward the stream of particles coming from the roll 24b.

One extremity of the divider bar 99 is extended beyond the arm 82, is of reduced cross-section and has keyed thereto an adjusting plate 103, (see Figures 3 and 7) formed with an integral handle 104. The adjusting plate 103 is provided with an arcuate slot 105, and disposed within the slot is a machine screw 106 threaded into an aperture formed in the arm 82, so that the adjusting plate may be clamped against movement. The adjusting plate is also provided with a pointer 107 cooperating with a scale 108 carried by the arm 82. It will be obvious that the divider bar 99 may be swung to a desired position by the handle 104, and held in the desired position by tightening the machine screw 106. The divider bar 99 carries plates 109, 110 at the extremities of its triangular portion, these plates being suitably fastened to the left hand face of the divider bar, as viewed in Figure 5.

The construction and arrangement of the divider bars is the same in all of the units 20, 21, 22, and 23.

Each unit 20, 21, 22, 23 comprises a receptacle or housing structure 111, serving to receive a portion of the particles coming from each respective roll, and serving also other purposes as will appear. As the receptacles 111 are all identical they may be described by reference to Figures 3, 5 and 7. The receptacle 111 has side plates or walls 112, 113, which are so spaced as to slightly clear the end plates 109, 110 on the divider bar 99.

The receptacle 111 further includes a wall 114 which serves as a top, front, and bottom wall for the receptacle. The bottom wall is curved, extends upwardly, and terminates at 116 in a recess 115 in the base of the divider bar 99.

The side walls 112, 113 are each provided with recesses 118, 119 to accommodate the rod 86 and the ends 100 of the divider bar.

The bottom wall of the receptacle 111 has suitably fastened thereto laterally and downwardly extending brackets 120, 121. The lower ends of the brackets 120, 121 are bent so as to rest flat on the support members 29, 30 respectively, and the bent ends are bifurcated, to receive, between the respective furcations, pins 122 secured to the respective supporting members 29, 30. The pins 122 are transversely apertured to receive securing pins 123.

The side wall 113 of the receptacle is apertured and this aperture communicates with an outwardly extending pocket 124, open at its upper end. The lower end of the pocket 124 has a conduit 125 secured thereto, having a telescoping connection with a conduit 126 leading to a suitable bin, in the case of the conduit 126 to a bin 127 (see Figure 1). In like manner conduits 128, 129, similarly related to the units 20 and 22, lead to other bins 130, 131, respectively. In the case of the unit 23 a conduit 132 is adapted to discharge directly into a bin 133 from the receptacle pocket 124 of that unit.

Disposed in the bottom of each receptacle 111 is a disk-like rake 134, which is secured to a rod 135 extending through the side of the pocket 124, and the outer extremity of the rod 135 is provided with a handle 136, so that material which has accumulated at the bottom of the receptacle may be removed by pulling outwardly on the handle 136 so as to cause the rake to scrape the material toward and into the pocket 124 and thence into the respective conduit 125, and in the case of the unit 23, into the conduit 132. It will be appreciated that other means may be provided for the purpose of removing material from the receptacle 111, such as an automatically regulated conveyor screw arrangement.

The front wall of the receptacle 111 of each unit 20, 21, 22, 23, carries a high potential insulating bushing 137, best seen in Figure 5. The insulating bushing 137 may have a conducting socket at each end, the sockets being connected by a conductor 143 (see Figure 7). The socket at the lower end of the bushing may have plugged thereinto a plug terminal on a conductor 138 which may be fixedly connected at the other end to the electrode 25 in any suitable manner. The socket at the outer end of the bushing 137 may have plugged thereinto a plug terminal on a conductor 139. The conductors 139 of the different units are here shown as fed from a high potential bus 140 suitably supported on high potential insulators. The bus 140 may be connected to the positive terminal of a source of electricity (not shown) providing variable unidirectional high potential, the other terminal being connected to the frame of the apparatus or to ground. With my invention potentials as low as 1,000 volts may be employed. It will be understood, however, that the electrodes 25 need not all be supplied with the same potential and that if desired the applied potentials may be individually variable.

The receptacles 111 are also each provided with a window 141 in its front wall, through which the action of the particles may be observed. Each receptacle 111 is also provided on its front wall with a pair of handles 142.

It will be apparent that the receptacles 111 each may be readily removed by withdrawing the pins 123, disconnecting the conductor 138 from the socket in the bushing 137, and pulling upwardly on the handles 142 to remove the end of the conduit 125 from the conduit 126, and swinging the receptacle about the bar 86 until the recess 118 and the bar 86 may be disengaged.

Each receptacle 111 serves to shield its associated electrode 25 and electrostatic treating zone from drafts, foreign electrical charges and other extraneous undesirable influences or interferences.

The chutes 26b, 26c, and 26d are identical and accordingly a description of the chute 26c, shown best in Figures 5, 8, 9, and 10, will serve for all.

The chute 26c comprises a platter-like frame 144, having upstanding side walls 145 and upstanding end walls 146, 156, as best seen in Figure 9. Extending across the chute between the side walls 145 is a partition or barrier 147 having a plurality of apertures 148, desirably distributed along the entire length of the barrier. The barrier 147 divides the chute into a receiving portion 149, disposed to receive some of the particles coming from the roll 24b, and what may be termed a conveying portion 150. The lower end wall, 156, of the frame is provided with a plurality of spaced apertures 151, desirably distributed along the entire length of the wall 156, and extending downwardly at a steeper angle than the surface of the portion 150, and opening at their lower ends into what may be termed the discharge portion of the chute. The discharge portion includes a nose piece 152 having a rectilinear margin stopping short of contact with the roll 24c. A sheet metal collecting and discharge controlling trough 157 (see also enlarged view in Figure 10), angular in cross-section, is secured to the nose piece 152 and has a bottom 153 the upper surface of which is flush with the lower discharge margin of the apertures 151. The bottom 153 has an upstanding wall 154. The trough 157 receives particles which flow through the inclined apertures 151 and discharges them onto the roll 24c. To the latter purpose the wall 154 is provided with a plurality of very small apertures 155, desirably distributed along the entire length of the wall 154, at the surface of the bottom wall 153. The trough 157 is provided with end walls 165 to prevent the particles from flowing endwise from the trough. The end walls 165 are spaced apart a distance somewhat less than that part of the roll 24c having the largest diameter. It will be noted that the trough 157, and the nose piece 152 are somewhat longer than the width of the portion 150 of the chute to prevent excess accumulation of particles at the end portions of the trough. The trough 157 may be fastened to the nose piece 152 by screws 158 and be adjustable toward and away from the free margin of the nose piece.

To control the flow of particles immediately before they reach the apertures 155, a swingable gate 159 is provided. The gate 159 has arms pivoted at 160 to opposite side walls 145 of the frame member 144, and has a generally V-shaped end 161 extending into the collecting trough 157. The gate 159 is biased by its own weight to the position shown in the drawings and the apex of the V-shaped end rests on the bottom wall 153. The apex of the V-shaped end of the gate is provided with small notches 162 to permit passage of the particles.

As best shown in Figure 10, one edge of the gate 159 is slotted to receive an elongated heating element 163 of the strip type, this heating element being secured in position by means of screw bolts 164 which are adapted to compress the walls of the slot against the sides of the heating element.

A sheet metal strip 166 may be secured to the wall 156 of the frame, so as to have its lower margin partially obstructing the inclined apertures 151, to level out the flow of particles coming out of these apertures.

As shown in Figure 10 the nose piece 152 and the discharge trough 157 are so related to the roll 24c that, should the roll cease revolving, the particles will form a mound on the roll sealing the apertures 155 in the trough 157, and stopping further flow of the particles onto the roll. How flow of particles is stopped elsewhere in the apparatus under abnormal conditions will be set forth hereinafter.

For supporting the upper end of the frame 144, opposite sides of the frame are provided with laterally extending arms 167, each having a screw-threaded aperture for receiving a screw-threaded stud 168, the stud bearing against the adjacent surface of a respective inclined supporting member 29, 30. For supporting the lower end of the frame 144, lugs 169 are provided, these lugs being spaced from the arms 167, longitudinally of the frame 144, and extending laterally, but not far enough to cross the support members 29, 30.

For cooperation with the lugs 169, there are mounted on the inside lateral walls of the supporting members 29, 30, brackets 170, each having a seat surface 171 in the general plane of the frame 144 and adapted to be engaged by screw-threaded studs 172 extending through the respective lugs 169. Each bracket 170 also has a transverse wall 173 through each of which extends a screw-threaded stud 174, each adapted to engage a respective transverse abutment surface of the lugs 169. Flat spring arms 175 are carried by the lateral sides of supporting members 29, 30, one end of each spring arm being secured to a respective supporting member, as by a machine screw 176, and the other end of the spring arm bearing against a longitudinally extending surface of a respective lug 169. An adjusting screw 177 is threaded through the respective supporting members 29, 30, each bearing against an intermediate portion of the respective spring arm 175 to adjust the spring pressure bearing against the lug surface.

It will be obvious that the frame 144 may be adjusted toward and away from the roll 24c by adjustment of the screws 174. If desired, lateral adjustment may be secured by adjustment of the screws 177. The relation of the margin of the nose piece 152 with respect to the roll 24c may also be adjusted by the screws 172. The angle of the frame 144 with respect to the horizontal may be adjusted by the screws 168 or by the screws 172 or by both. The angle of the chute with respect to the horizontal is desirably so adjusted that the angle is a predetermined amount greater than the angle of repose of the particles being treated, resulting in slow descent of the particles.

The conveying surface 150 of the frame 144 is covered by a sheet metal plate 178 (see Figure 5). The plate 178 extends upwardly slightly over the barrier 147 and has a portion 179 extending upwardly at right angles. The extremity of the portion 179 is bent at an angle to the portion 179 and extends into the recess 115 of the divider 99.

Over the plate 178 and suitably fastened thereto is a dish-like sheet metal member 180, forming a space in which heat insulating material 181 may be disposed. The inner surface of the plate 178 is desirably highly polished to reflect the heat toward the upper surface of the frame 144.

The under-surface of the frame 144 is recessed, to provide space for a plurality of heating elements 182, preferably of the strip type, these elements being secured to the under-surface of the frame by means of a desired number of spanning plates 183, and bolts 184, 185. On the bolts 184 are provided spacer washers 186 which bear against a baffle plate 187 which in turn bears against nuts 188 holding the spanning plate 183, and is thus held spaced from the spanning plate. The baffle 187 desirably has a highly polished surface so as to reflect the heat toward the under-surface of the frame 144. Heat insulating material 189 may be disposed between the baffle plate 187 and a dished sheet metal plate forming a cover 190 for the under-surface of the frame 144. The cover 190 cooperates with a housing 191 to house insulated bus bars 192 to which the terminals of the strip heaters 182 are respectively connected. Terminal studs 194 are connected to the bus bars 192, and conductors 195, connected to the terminal studs 194, lead to a source of current. A junction box 196 supported by the housing 191 may be provided for the terminal studs 195.

Each roll has cooperating therewith means for removing therefrom particles that adhere thereto after those particles have passed out of the range of the electrostatic field provided by the respective electrodes 25. To that end each roll has cooperating therewith a brush, in the case of the roll 24b the brush 197b, extending along the active length of the roll 24b. The brush, 197b, is carried by a rod 198 in turn suitably carried by the supports 29, 30.

A sheet metal auxiliary or back chute 199b is disposed, generally at right angles to the chute structure 26c and in such position that particles brushed from the roll 24b are adapted to fall into it and thence slide to a bin 200b (see Figure 1). These particles may be termed the "backs." The units 20, 22, 23 are similarly provided with back chutes 199a, 199c, 199d leading to bins 200a, 200c, 200d respectively.

Each back chute has a flange 201 extending downwardly from the entrance edge of the chute, and is adjustably mounted for movement transversely with respect to the axis of the respective roll. To the latter end brackets, one of which 202, may be seen in Figure 5, are suitably secured to the flange 201 at opposite sides of the back chute, these brackets having elongated slots 203 accommodating screw-threaded bolts 204 which engage in screw-threaded apertures formed in the supporting member 29, 30 respectively. The flange 201 serves to define a space between it and the divider 99 through which a desired portion of the particles coming from the roll are adapted to fall. This portion of the particles may be termed the "heads."

For further defining the space through which the heads are to fall, the respective chute structures 26 each may be provided with sheet metal auxiliary side plates 205, recessed to accommodate the cylindrical ends 100 of the divider bar 99. These plates 205 serve as downward continuations of portions of the walls 112, 113 of the receptacle 111.

Means is provided for measuring the temperature of the "heads," here shown as including an elongated tube 206, containing thermally responsive expansible fluid, supported by angular brackets one of which, 207, may be seen in Figures 5 and 9, suitably fastened to the receiving surface 149 of the frame 144. The brackets also carry a collecting trough 208, surrounding the tube, and open at the top and bottom, so that at least a portion of the heads will be collected in the trough and pass in proximity to the thermally responsive tube, and out of the open bottom of the trough structure.

Another tube, 209, similar to the tube 206, is disposed adjacent the lower end of the conveying portion 150 of the frame 144, and is supported at its ends by angular brackets one of which, 210, may be seen in Figures 5 and 9. The tube 209 is so supported that its underside is close to the surface 150 but leaving sufficient space for the stream of particles to flow under the tube. As indicated in Figure 9, the thermally responsive tubes 206, 209 need not extend fully across the frame 144, satisfactory results being obtained when the tubes extend from one side to substantially the middle of the chute surfaces of the frame, or otherwise partway across these surfaces.

The thermally responsive tubes are provided with conduits 211, 212 leading outwardly of the chute structure to indicating instruments as will further appear.

The uppermost chute structure, 26a (shown in detail in Figure 4) is adapted to be fed by a plurality of pipes 213 leading from an open top dish-shaped receptacle 214. The pipes 213 have branches 215 (see Figure 2) so as to more evenly distribute particles to the receiving portion 149. The receptacle 214 is carried by a hopper 216, by means of straps 217, and the hopper is in turn carried by the spaced supporting members 29, 30, by means of a circular tubular band 218 secured to the hopper. The band 218 is secured to braces 219 which are in turn secured to the supporting members 29, 30. As best shown in Figure 4, the hopper 216 is of inverted cone shape, the large open end supporting a plate-like member 220 having an open bottom, a screen 221 being secured in spanning relation with respect to the open bottom. The plate-like member 220 is merely hung within the hopper, its rim resting on the upper rim of the hopper, and is readily removable. A cover 222 is provided to close the plate-like member 220 and the hopper.

Material may be conducted to the hopper by means of a conveyer 223 (Figure 1), such as a belt conveyer carrying scoop buckets, the scoop buckets emptying into a conduit 224 at the upper end of the conveyer, and the conduit discharging into the hopper 216. The cover 222 of the hopper may be apertured to provide for the conduit 224, or the cover 222 may be removed if desired. As best shown in Figure 1 the hopper 216 is desirably provided with a low-level responsive device 225 of any suitable form, and the conduit 224 is desirably provided with a high-level responsive device 226, these level responsive devices being responsive to the minimum and maximum levels of the material in the hopper, and operate to control the conveyer 223 as will appear.

In Figure 15 is shown an electrical system which may be employed with the level responsive devices 224, 225. This system comprises a switch 227, which is operable by the maximum level control device 226, and a switch 228 which is operable by the minimum level control device 225. A motor 229 for operating the conveyer 223 may be fed from the line 230, through a manual switch 231 and through a contact 232 of an electromagnetically operated contactor having an operating coil 233. The operating coil is connectable in shunt with the line 230 through a holding contact 234 operable by the contactor, and through the level responsive switch 227. The level responsive switch 228 is connectable in shunt with the holding contact 234. Assuming that the manual switch 231 is closed, and also that the hopper 216 is entirely empty, the switches 227, 228 will be closed by the respective level responsive devices causing energization of the coil 233 of the contactor and closure of the contacts 232, 234. Closure of contact 232 completes the circuit through the conveyer motor 229, starting the feed to the hopper 216. When the level in the hopper rises to the level responsive device 225, the latter opens the switch 228 but the contactor is maintained closed by the coil 233 because the holding contact 234 is held closed. When the maximum level is reached, the maximum level control device 226 opens the switch 227, which causes deenergization of the contactor coil 233, and the contactor is caused to open by reason of a spring or gravity, simultaneously opening the contacts 232, 234, thus breaking the circuit through the conveyer motor 229 and stopping the feed to the hopper. When the material again drops to the minimum level, the switch 228 closes, and the previously described cycle is repeated.

The uppermost chute structure 26a, not having any roll above it, serves only to feed particles from the hopper means 27 to roll 24a below it, but is otherwise constructed and arranged as already described in connection with the chute structures 26 (b to d).

Disposed below the lowermost roll, 24d, is the delivery chute 28, for receiving the heads from the unit 23; the upper end of the chute 28 runs the active length of the roll 24d, tapers to a smaller size at its lower end and leads into a hopper 236 at the base of a conveyer 237 adapted to take material from the hopper 236 and convey it to a desired place. The delivery chute 28 is suitably secured to the spaced supporting members 29, 30 as best shown in Figure 6.

The lowermost roll, 24d, is rotatable by a sheave 238 driven by belts from a motor (not shown). The roll 24d also has secured thereto a smaller sheave 239 adapted to drive a sheave 240 secured to the roll 24c through belts 241. The sheave 240 is here shown as adapted to carry belts 242 for driving a sheave 243 secured to the roll 24b, and in like manner the sheave 243 carries a belt 244 for driving a sheave 245 secured to the roll 24a. It will accordingly be apparent that each roll serves as a transmitting means for transmitting power to drive all of the rolls which are at a higher level. Thus, for example, if the belts 242 should break, rolls 24c, and 24d would continue to rotate but rolls 24a and 24b would stop. Or, if the belts 242 should slip, the roll 24a as well as the roll 24b would be driven more slowly.

Each of the rolls is driven in the direction indicated by the arrows (see for example Figure 5) and is preferably driven at a speed such that the effect of centrifugal force on the particles is substantially absent.

The heating of the rolls 24 (a to d) and the chutes 26 (a to d) may be controlled by the control apparatus shown in Figure 14, comprising a plurality of panel boards. There are desirably at least as many pairs of panel boards as there are treating units 20, 21, 22, 23. A description of one pair of panels, 246, 247, will suffice for all of the panels. A pair of conductors 248 lead from the panel 246 to the heating element 51 of the roll 24a. These conductors 248 may be the same as or an electrical continuation of the conductors 77 in Figure 11. The conductors 248 may be supplied with current from a bus 249 and any one of a plurality of buses 250, the bus 249 leading to one terminal of a transformer (not shown) and the buses 250 leading to taps on the transformer. A selector switch 251 is provided for selecting the desired transformer tap bus. Interposed between the selector switch 251 and the conductors 248 is a manually operable switch 252, normally closed when the apparatus is in operation, and a contactor 253 having an operating coil 254. The contactor is here shown as of a type which opens its contacts when the coil 254 is energized, the contacts being normally held in closed position by a spring 255, or by gravity. Those skilled in the art will understand that, if desired, the contactor may be of the type in which the operating coil closes the contactor and a spring or gravity biases it to open position.

The coil 254 of the contactor is adapted to be energized from a pair of bus conductors 256 leading to a source of current (not shown), and energization of the coil 254 is controlled by a temperature indicating instrument 257 the movable element of which is adapted to close a switch having a relatively stationary contact 258, the switch being interposed in the circuit of the coil 254 and operable when a predetermined temperature is reached. The contact 258 may be adjusted to any predetermined temperature as indicated by a pointer 259.

The movable element of the temperature indicator 257 is actuated by the expansible fluid in the thermally responsive device 206 disposed in the path of the heads coming from the roll 24a, by means of a tube 260 leading to the device 206. When the temperature of these heads rises to a predetermined value the temperature indicator causes energization of the coil 254 thus interrupting the circuit of the heating element 51 of the roll 24a. When the temperature of the heads is below the predetermined value the contactor 253 remains closed.

The supply of current to the heating element 51 may be interrupted at any time by the switch 252 and also set at a selected value by the selector switch 251.

The construction and operation of the panel 247 is identical with that of the panel 246 except that a temperature indicator 261, corresponding to the indicator 257, has a tube 262 leading to the thermally responsive device 209 on the chute 26a, and conductors 263 lead to the strip heaters 182 for heating the chute 26a. Thus the apparatus in the panel 247 controls the current to the strip heaters 182 of the chute 26a in a manner similar to that already described with respect to the control of the heating of roll 24a by the apparatus on the panel 246.

The respective heating elements 163 of the respective gates 159 may also be controlled in a manner similar to that described, and may be controlled by the same control which regulates the operation of the heating element within the respective adjacent rolls.

If desired, an indicator light 264 may be mounted on each panel, and may be so connected that it will indicate whether the heaters connected to that panel are energized or not.

Safety fuses 265 may be interposed in the supply lines.

In the operation of the machine, material from the hopper 216 is delivered to the dish-shaped receptacle 214, from where it passes through the pipes 213 and is distributed over the receiving surface 149 of the chute 26a. The material then gravitates through the apertures 148 in the barrier 147 onto the conveying surface 150 down that surface and through the inclined apertures 151 into the trough 157. In the trough 157 the particles must flow through the notches 162 in the gate 159 and thence through the fine apertures 155 in the wall of the trough 157, onto the roll 24a. It will be evident that the construction and arrangement of the chute structure is such that by the time the particles reach the roll they will be evenly distributed onto the roll and will fall thereon in a very thin stream so that as the roll rotates, it will carry only a very thin film of particles. Meanwhile the particles have been heated by the strip heaters 182 and 163, and the film of particles on the roll is either further heated to a higher temperature or maintained heated by the heater 51 in the roll.

The temperature to which the particles are heated will depend on the nature of the particles, in accordance with the process disclosed in my co-pending application Serial Number 755,694.

As the roll 24a rotates it brings the film of particles thereon into the range of influence of the positively electrically charged electrode 25a. Since the action in unit 21 is the same as in unit 20 reference may now be had to Figure 5 for a clearer understanding of the further progress of the particles under the influence of the electrostatic field not only in the unit 20 but in all of the succeeding units.

By reason of the heated condition of the particles the motion response of particles of different nature is different and consequently the speed and trajectories of a portion of the particles will be such that they will fall to the left of the divider 99, as viewed in Figure 5; these particles, the tails, accumulate in the receptacle 111. Another portion of the particles, which have a smaller motion response to the electrostatic field, fall between the divider 99 and the flange 201; these are the heads. Another portion of the particles either falls off of the roll to the right of the flange 201, into the back chute 199b, or adheres to the roll and is brushed off, by the brush 197b, into the auxiliary chute 199b; these particles are the backs.

It will be evident, in view of the construction and arrangement of the electrode 25b, that mechanical deflection by the electrode of particles coming towards the electrode from the roll 24b, is minimized, while at the same time undesirable intensity of field as between the electrode and, for example, the divider 99 is avoided.

It will be evident that for a given temperature of the particles and a given potential on the electrode, the relative proportions as between the tails, the heads, and the backs may be varied by adjustment of the divider 99 or by adjustment of the flange 201 or by adjustment of electrode or by any combination of these adjustments.

Thus, the heads from any one of the rolls fall onto the next succeeding chute, as for example, the heads from the roll 24a of the unit 20 fall onto the chute 26b. In the unit 21 the heads coming from the unit roll 24b are further divided into tails, heads, and backs as hereinbefore described, and so on through the lowermost unit 23 from which the final heads pass into the unheated chute 28.

When the apparatus is used for the production of refractory material suitable for example for refractory electrical insulating material, the heads are the final desired product. However, any one or all of the heads, the tails or the backs may constitute valuable products.

It will of course be evident that any one of the portions of the separated particles may be again run through the apparatus for a further separation.

As pointed out in my co-pending application Serial Number 755,694, successive treatments of the material may be at different temperatures, that is, the temperature of the particles while in the field of the electrode 25a may be a selected temperature and the temperature of the particles while in the field of the electrode 25b may be at a different selected temperature, either higher or lower than the first named temperature, and so on through the successive units.

The construction and arrangement of the apparatus is such that should one of the rolls stop rotating, the flow of particles will be automatically stopped thus preventing an accumulation in undesired places of untreated particles mixed with previously treated particles. For example, referring to Figure 5, should the roll 24b stop (whereupon the roll 24a also stops) the particles will form a mound on the roll 24b preventing further flow of particles out of the apertures 155. Any particles descending on the chute will form a mound in the trough 157 high enough to prevent further flow of particles through the notches 162 in the gate 159. The particles piling up behind the gate 159 will choke off flow of particles out of the aperture 151 and thus the complete drainage from the chute 266 of particles on the chute is prevented. The same action occurs with respect to the roll 24a and the chute 26a (Figure 4). Further, since the chute 26a is fed by the pipes 213, while the drainage of particles off of the chute onto the roll is stopped, particles will be continued to be fed to the chute by the pipes 213 but only until the particles rise so as to choke the lower ends of the pipes. It will be noted that the lower ends of the pipes 213 are close to the receiving surface 149. Further, when the receptacle 214 fills high enough to cover the outlet of the hopper 216, the flow from the hopper will also be choked off. Flow into the hopper will be stopped by the maximum level device 226. Thus undesired flow of particles anywhere above a stopped roll is effectively stopped.

The rolls below a stopped roll may continue to rotate and any material left in the chutes associated with these rolls will be treated and separated into tails, heads, and backs in the manner hereinbefore described.

From the foregoing it will be apparent to those skilled in the art that the illustrated embodiment of my invention provides new and improved electrostatic separation of material particles and new and improved apparatus for carrying out electrostatic separation, and accordingly, accomplishes the principal object of my invention. On the other hand, it also will be obvious to those skilled in the art that the illustrated embodiment of my invention may be variously changed and modified, or features thereof, singly or collectively, embodied in other combinations than those illustrated, without departing from the spirit of my invention, or sacrificing all of the advantages thereof, and that accordingly, the disclosure herein is illustrative only, and my invention is not limited thereto.

I claim:

1. In combination in apparatus for electrostatic separation of material particles: receiving means constructed and arranged to receive particles coming from an electrostatic treating zone; said receiving means comprising receptacle means having a wall extending upwardly toward said zone, and comprising dividing wall means forming an upward continuation of said wall; said dividing wall means being so constructed and arranged that its upper margin is movable in a direction transversely of said margin while leaving said receptacle means in a fixed position; means for supporting said receptacle means; and said supporting means and said receptacle means being relatively so constructed and arranged that said receptacle means is detachable from said supporting means while leaving said dividing wall means in operative position.

2. In apparatus for electrostatic separation of material particles: receiving means having a metallic surface for receiving particles to be treated; and an elongated metallic electrode the longitudinal axis of which extends approximately parallel to said surface, said electrode having a substantially uniform cross-section of rounded oblong form, said electrode being so disposed that the longer general axis of said oblong cross-section extends in a general direction transverse to the nearest portion of said surface.

3. In apparatus for electrostatic separation of material particles: receiving means having a metallic surface for receiving particles to be treated; and an elongated metallic electrode the longitudinal axis of which extends approximately parallel to said surface; metallic dividing wall means disposed below and transverse to the general common plane of said electrode and said receiving means; said electrode having a substantially uniform cross-section of rounded oblong form, said electrode being so disposed that the longer general axis of said oblong cross-section extends in a general direction transverse to the nearest portion of said surface, and transverse to the general plane of said dividing wall means.

4. In apparatus for electrostatic separation of material particles: receiving means having a metallic surface for receiving particles to be treated; and an elongated metallic electrode the longitudinal axis of which extends approximately parallel to said surface, said electrode having a substantially uniform cross-section of generally ovoid form, said electrode being so disposed that the taper of said ovoid cross-section is toward said surface.

5. In apparatus for electrostatic separation of material particles: receiving means having a metallic surface for receiving particles to be treated; and an elongated metallic electrode the longitudinal axis of which extends approximately parallel to said surface; metallic dividing wall means disposed below and transverse to the general common plane of said electrode and said receiving means; said electrode having a substantially uniform cross-section of generally ovoid form, said electrode being so disposed that the taper of said ovoid cross-section is toward said surface, and the general plane of said dividing wall means is approximately transverse to a lateral surface of said electrode.

6. In combination in apparatus for electrostatic separation of material particles: means for treating the particles, including a roll, chute means for discharging particles onto said roll, means for producing an electrostatic treating zone at said roll, means for heating said chute means thereby to heat the particles on said chute means, means for heating said roll thereby to heat the particles on said roll; means responsive to the temperature of the particles after they have left said roll; means, controlled by said temperature responsive means, constructed and arranged to regulate the heat supplied by said roll-heating means; means responsive to the temperature of the particles on said chute means; and means, controlled by said last named temperature responsive means, constructed and arranged to regulate the heat supplied by said heating means for said chute means.

7. In combination in apparatus for electrostatic separation of material particles: a cylindrical roll for receiving particles to be separated; inclined chute means for conveying particles to said roll, said chute means having a substantially rectilinear discharge edge; means for supporting said chute means with its discharge edge adjacent said roll; and means, for adjusting said chute means, so constructed and arranged that said chute means may be tilted, about an axis transverse to said roll, from one plane into another plane at an angle to said first named plane, and so that said chute means is movable in its own general plane about an axis transverse to that plane.

8. In combination in apparatus for electrostatic separation of material particles: a hollow rotatable metallic roll for receiving particles thereon; bearings in which end portions of said roll are journaled; a generally cylindrical electrical heating unit disposed co-axially with and in said roll and rotatable with said roll; insulated contact means carried by and rotatable with said roll at its respective ends; means connecting said roll-carried contacts to said heating unit, said roll and said heating unit being so constructed and arranged that upon removal of said insulated roll-carried contact means said heating unit is removable from and insertable into said hollow roll while said roll remains in said bearings; and relatively stationary means engaging said roll-carried contacts.

9. In combination in apparatus for electrostatic separation of material particles: means for receiving particles to be treated; an electrode for electrostatically treating particles on said receiving means; metallic combined housing means and receptacle means, so constructed and arranged that it shields said electrode from extraneous influences and receives particles coming from said receiving means; means, including pivot means, constructed and arranged to support said combined housing and receptacle means in operative relation with respect to said electrode; said combined housing and receptacle means and said supporting means being relatively so constructed and arranged that by swinging said combined housing and receptacle means about said pivot means to a predetermined position said combined housing and receptacle means is removable from said supporting means by predetermined movement of said combined housing and receptacle means relative to said supporting means.

10. In apparatus for electrostatic separation of material particles: a roll for receiving particles to be treated; an elongated metallic electrode of substantially uniform rounded oblong cross-section, spaced from and extending approximately parallel to said roll, constructed and arranged to charge said roll and particles thereon by induction; metallic dividing wall means, the upper margin of which is disposed below the level of said electrode and spaced from said roll, so constructed and arranged that particles projected off of said roll under the influence of electrostatic repulsion by said roll and attraction by said electrode may fall partly to either side of said wall means depending on the speed of projection; said electrode being so constructed and arranged that mechanical deflection of particles by impingement against said electrode is decreased.

11. In apparatus for electrostatic separation of material particles: receiving means having a metallic surface for receiving particles to be treated; and an elongated metallic electrode the longitudinal axis of which extends approximately parallel to said surface; metallic dividing wall means disposed below and transverse to the general common plane of said electrode and said receiving means and having its upper margin spaced from said surface at least as far as said electrode is spaced from said surface; said electrode having a cross-section of rounded oblong form, and being so disposed that the longer general axis of said oblong cross-section extends in a general direction transverse to the nearest portion of said surface, and transverse to the general plane of said dividing wall means.

12. In apparatus for electrostatic separation of material particles: receiving means having a metallic surface for receiving particles to be treated; and an elongated metallic electrode the longitudinal axis of which extends approximately parallel to said surface; metallic dividing wall means disposed below and transverse to the general common plane of said electrode and said receiving means and having its upper margin spaced from said surface at least as far as said electrode is spaced from said surface; said electrode having a cross-section of generally ovoid form, said electrode being so disposed that the taper of said ovoid cross-section is toward said surface, and the general plane of said dividing wall means is approximately transverse to a lateral surface of said electrode.

13. In combination in apparatus for electrostatic separation of material particles: a plurality of rolls, each roll being disposed at a successively lower level; chute means for feeding particles onto the highest of said rolls; chute means, each for feeding material coming from a roll to the next lower roll; each of said chute means and the respective next lower roll being relatively so constructed and arranged that stoppage of said roll stops feeding of particles from said chute means to said roll; said first named chute means having a conveying surface leading from a receiving portion to a discharge portion and disposed at an angle greater than the angle of repose of said particles; conduit means for feeding particles onto said receiving portion, said conduit means having a discharge aperture a predetermined distance above said receiving portion; means, including confining wall means forming a confined space at the open side of said chute means, so constructed and arranged that if discharge of particles from said chute means ceases, feeding of particles to said chute means from said conduit means to said receiving portion may continue only until particles in said confined space reach substantially the level of the discharge aperture of said conduit means; means for applying power to rotate the lowermost of said rolls; and means whereby each other roll is driven by power transmitted to it from a lower roll.

14. In apparatus for electrostatic separation of material particles: chute means for conveying particles to a treating zone, said chute means comprising an inclined plane portion having a first area of given average level and a second area of lower average level, said second area being narrower than said first area, said chute means being so constructed and arranged that said particles descend thereon under the influence of gravity; and means, including a first barrier, having a plurality of spaced apertures, disposed approximately at the junction between said first and second areas, and a second barrier, having a plurality of spaced apertures, disposed on said second area, so constructed and arranged as to cooperate with particles descending on said plane portion to distribute the particles substantially uniformly on said chute means by reason of their descent by gravity on said chute means.

15. In combination in apparatus for electrostatic separation of material particles: means for treating the particles, including means for conveying the particles into a treating zone, an electrode for producing an electrostatic field between said electrode and said conveying means, and heating means for heating said conveying means thereby to heat the particles; means, disposed in the path of particles falling from said conveying means out of said field, responsive to the temperature of said falling particles; and means, controlled by said temperature responsive means, constructed and arranged to regulate the heat supplied by said heating means.

16. In apparatus for electrostatic separation of material particles: chute means for conveying particles to a treating zone, said chute means including a first conveying plane surface portion inclined downwardly to a second conveying plane surface portion, said second portion being inclined downwardly, in the same general direction as said first portion, and leading to the discharge edge of said chute means, said first portion making a predetermined angle with the horizontal, greater than the angle of repose of said particles, and said second portion making an angle with the horizontal greater than said predetermined angle; a roll disposed with its axis substantially parallel to the discharge edge of said chute means and with an upper surface of said roll in proximity to said discharge edge; and a barrier at the discharge edge of said chute means, said barrier having a plurality of spaced apertures through which the particles are discharged directly onto said surface of said roll.

EDWIN L. WIEGAND.